United States Patent [19]
Nanzai

[11] Patent Number: 5,881,616
[45] Date of Patent: Mar. 16, 1999

[54] PIPE CUTTING APPARATUS

[75] Inventor: Takashi Nanzai, Fujisawa, Japan

[73] Assignee: Ihara High Pressure Fittings Co., Ltd., Tokyo, Japan

[21] Appl. No.: 736,423

[22] Filed: Oct. 24, 1996

[30] Foreign Application Priority Data

Oct. 31, 1995 [JP] Japan ..................................... 7-284137

[51] Int. Cl.⁶ .................................................. B23B 3/04
[52] U.S. Cl. .................................................. 82/72; 82/61
[58] Field of Search ................................. 82/72, 53.1, 54, 82/59, 61, 113, 64; 83/54

[56] References Cited

U.S. PATENT DOCUMENTS

| | | | |
|---|---|---|---|
| 4,430,913 | 2/1984 | Williamson | 82/70.2 |
| 5,603,250 | 2/1997 | Robinson | 82/61 |

Primary Examiner—Daniel W. Howell
Assistant Examiner—Mark Williams
Attorney, Agent, or Firm—Kanesaka & Takeuchi

[57] ABSTRACT

A cam mounting gear having a number of teeth smaller by one than the number of teeth of a main gear which is driven to rotate is disposed in parallel to the main gear, and a cam having a tapered face formed thereon such that the thickness thereof gradually increases along an inner periphery thereof is disposed on an inner wall of the cam mounting gear. A main holder having a cutter blade and a bearing which contacts with the cam is supported for rotation on a flat face portion of the main gear. As rotation of the main gear is transmitted to the cam mounting gear via a pinion, the bearing of the main holder is driven to roll on the tapered face of the cam, and thereupon, the cutter blade is displaced in a direction toward the center of the apparatus to cut a cutting object pipe located at a central location of the apparatus.

7 Claims, 8 Drawing Sheets

PIPE CUTTING APPARATUS

BACKGROUND OF THE INVENTION

1. Field of the Invention

This invention relates to a pipe cutting apparatus, and more particularly to a pipe cutting apparatus which can automatically and efficiently cut a metal pipe, particularly a special metal pipe for gas piping for use in a clean room.

2. Description of the Related Art

As a conventional pipe cutting apparatus of the type mentioned above, a pipe cutting apparatus having a construction shown, for example, in FIGS. 1a and 1b is known. FIG. 1a is a schematic view of a pipe cutting apparatus, and FIG. 1b is a partial sectional view taken along line A—A of FIG. 1a.

Referring to FIGS. 1a and 1b, reference numeral 31 denotes a rotary blade, and two pipe pressers 32 are disposed for rotation in an opposing relationship to rotary blade 31. Cutting object pipe 33 is inserted among rotary blade 31 and pipe pressers 32.

In a cutting operation, the components of the pipe cutting apparatus mentioned above are rotated in directions indicated by arrow marks in FIG. 1a, and cutting object pipe 33 is cut by rotary blade 31 as seen in FIG. 1b while it is rotated. Burs 33a and so forth produced upon cutting of cutting object pipe 33 are removed by a deburring apparatus provided separately.

Since the conventional pipe cutting apparatus is constructed in such a manner as described above, burs, or concaves and/or convexes are formed on an inner side wall of a cut portion or on a cut face of a pipe and make various obstacles to use of the pipe. Further, in order to remove such burs or concaves and/or convexes, a cumbersome operation is required, and much labor and consumption of time cannot be avoided for the operation.

SUMMARY OF THE INVENTION

It is an object of the present invention to provide a pipe cutting apparatus which can automatically and efficiently cut a pipe without forming burs or concaves and/or convexes on an inner side wall of a cut portion or on a cut face of the pipe.

It is another object of the present invention to provide a pipe cutting apparatus which is suitably used to cut a special metal pipe for gap piping which is used in a clean room.

It is a further object of the present invention to provide a pipe cutting apparatus which exhibits very superior effects in fixing and cutting a cutting object pipe.

It is a still further object of the present invention to provide a pipe cutting apparatus which prevents a cutter blade from being fed by an excessive amount.

In order to attain the objects described above, according to the present invention, there is provided a pipe cutting apparatus, characterized in that it comprises a first pinion supported for rotation on a housing and driven to rotate by rotational driving means, a main gear supported for rotation on the housing and held in meshing engagement with the first pinion, a cam mounting gear mounted on the housing in parallel to the main gear for rotation independently of the main gear and having a number of teeth smaller by one than the number of teeth of the main gear, a cam secured along an inner wall of the cam mounting gear, a second pinion supported for rotation on the housing and held in meshing engagement with the main gear and the cam mounting gear, a pipe fixing chuck for removably holding a cutting object pipe such that the cutting object pipe extends through an opening provided at a central portion of the main gear, and a main holder supported for rotation on a flat face portion of the main gear and partially having a cutter blade mounting member and a bearing which engages and rotates with a cam face of the cam.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 1B is a partial sectional view taken along line B—B of FIG. 1a;

DETAILED DESCRIPTION OF THE PREFERRED EMBODIMENT

A preferred embodiment of the present invention is described in detail below with reference to the drawings.

Figure 1B:
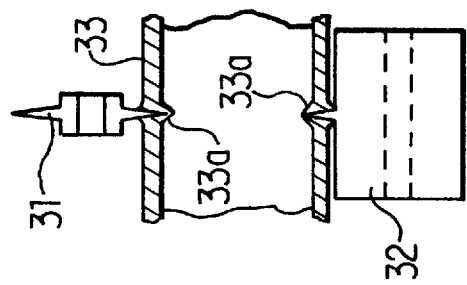
Figure 1A:
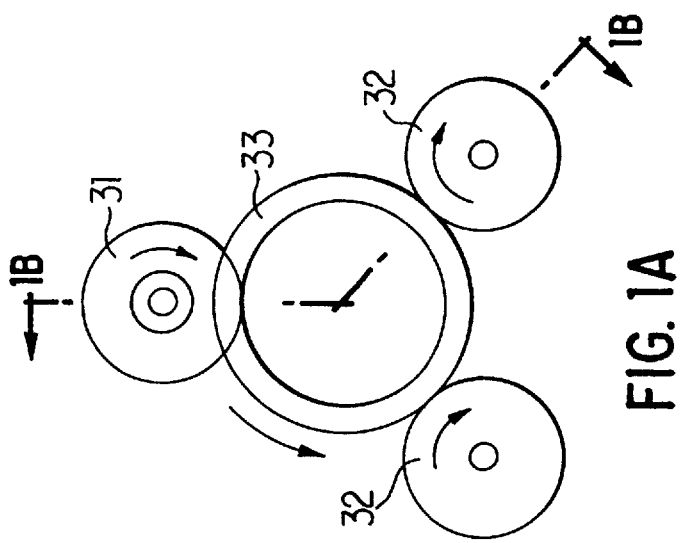
FIG. 1A is a schematic view of a conventional pipe cutting apparatus.
Figure 2:
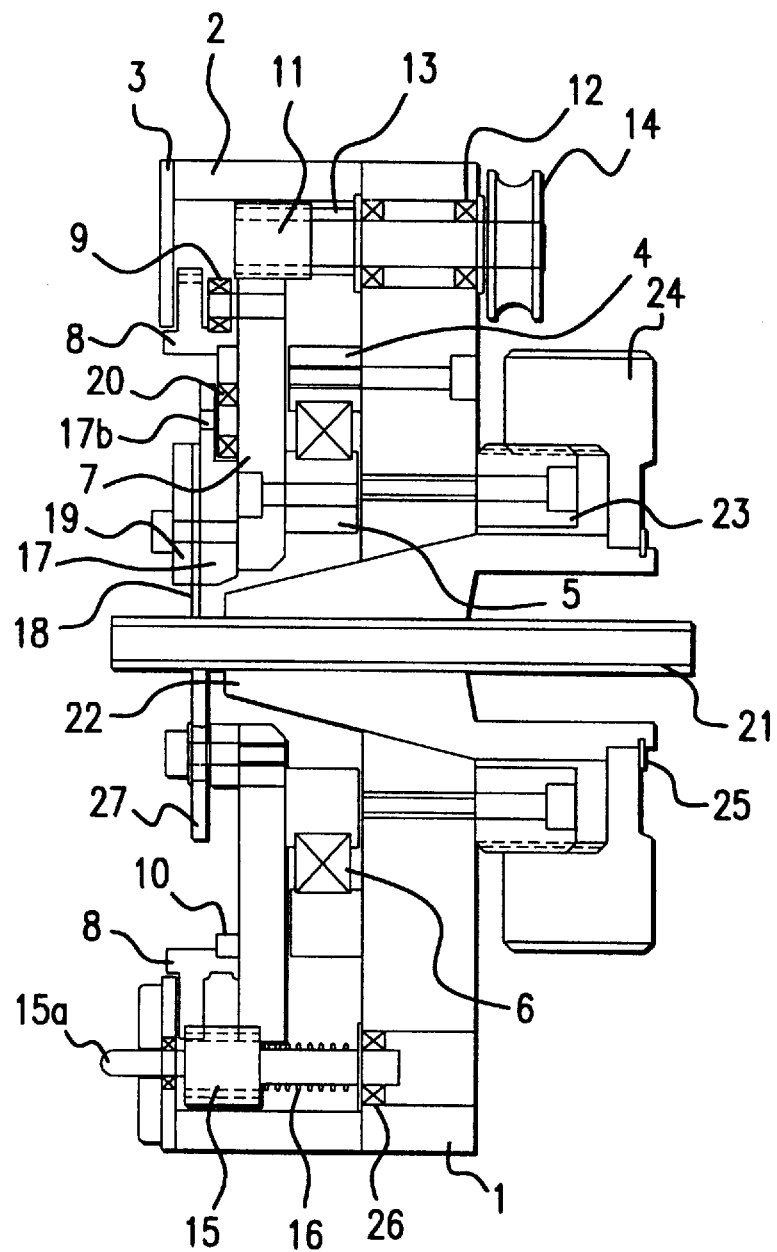
FIG. 2 is a sectional view showing an embodiment of a pipe cutting apparatus of the present invention.
Figure 3:
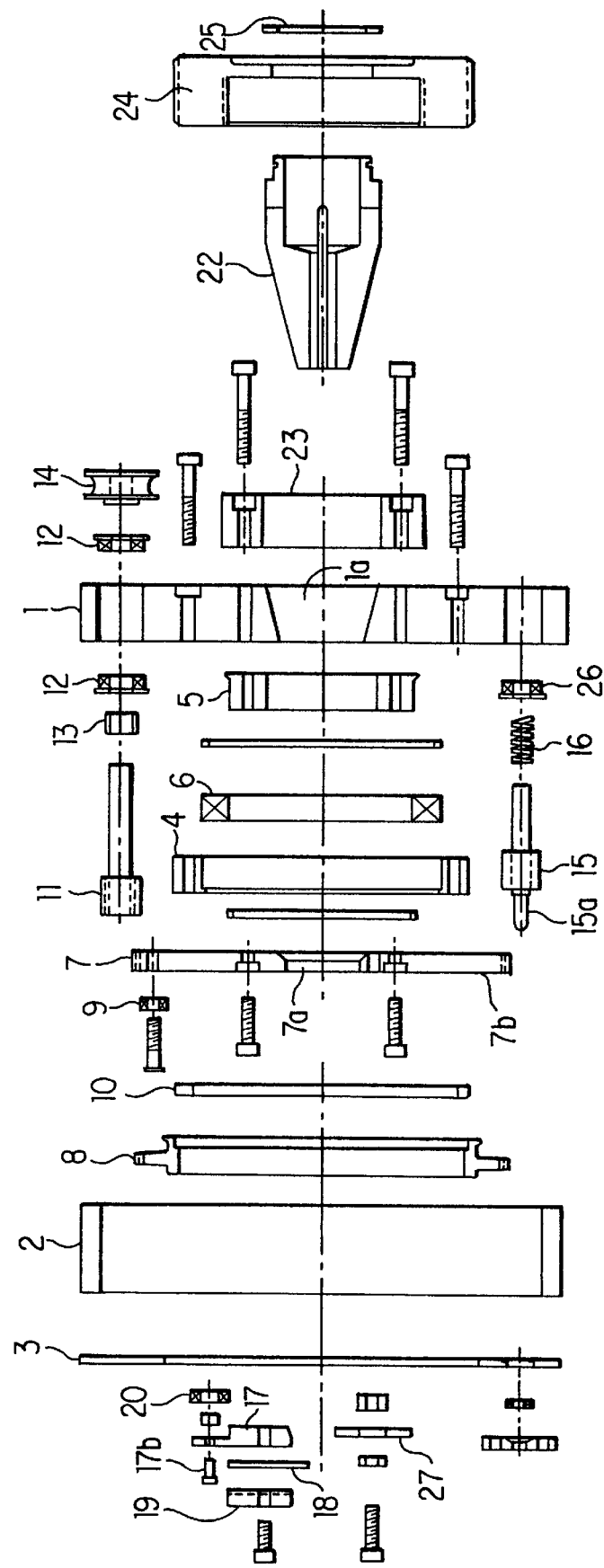
FIG. 3 is an exploded side elevational view of the pipe cutting apparatus shown in FIG. 2.
Figure 4:
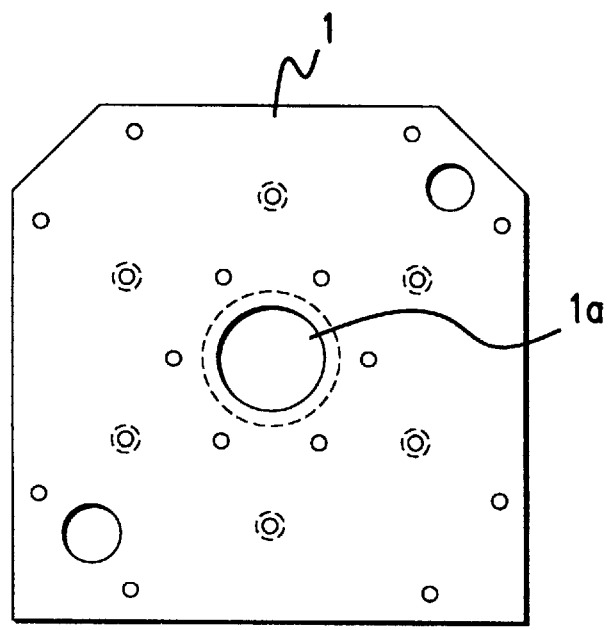
FIG. 4 is a front elevational view of a first housing.
Figure 5:
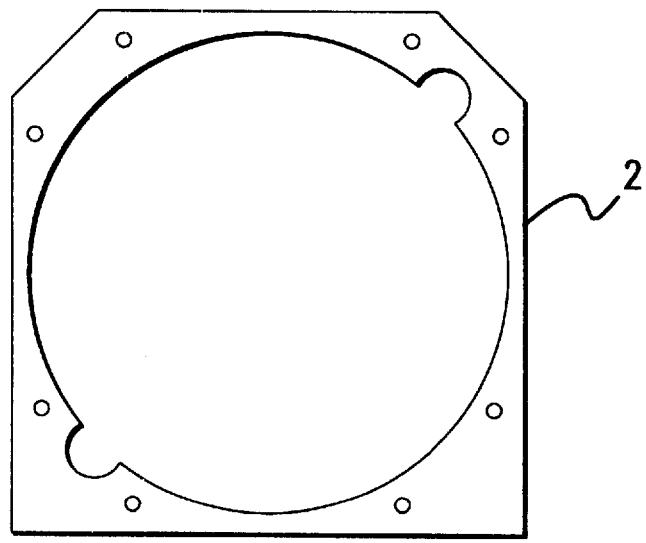
FIG. 5 is a front elevational view of a second housing.
Figure 6:
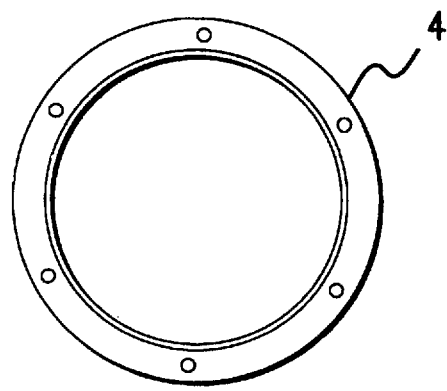
FIG. 6 is a front elevational view of a first main bearing mounting ring.

Referring to FIGS. 2 and 3, reference numerals 1, 2 and 3 denote first, second and third housings, respectively. First housing 1 is such a front wall as shown in FIG. 4; second housing 2 is such an outer peripheral wall as shown in FIG. 5; and third housing 3 is a rear wall, and those housings 1, 2 and 3 are connected and coupled to each other to form a single housing as a whole. Such hole 1a as shown in FIG. 4 is formed at a central portion of first housing 1, and such first main bearing mounting ring (large diameter) 4 as shown in FIG. 6 is secured around hole 1a.

Figure 7:
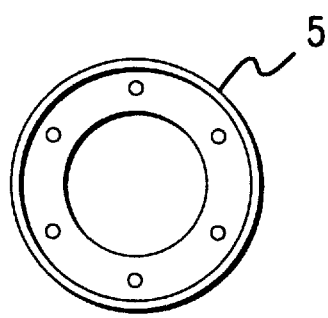
FIG. 7 is a front elevational view of a second main bearing mounting ring.
Figure 8:
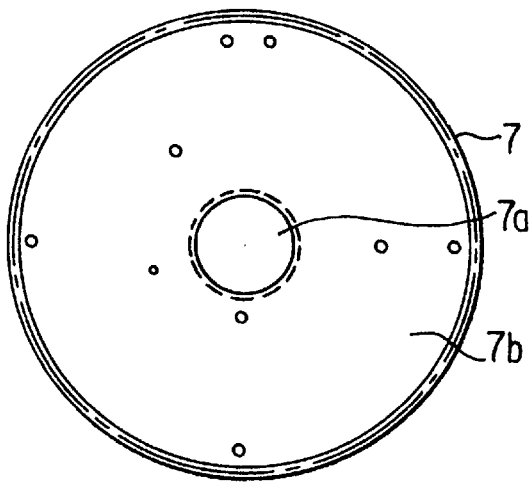
FIG. 8 is a front elevational view of a main gear.

Reference numeral 7 denotes such a main gear having hole 7a formed at a central portion thereof as shown in FIG. 8. Such second main bearing mounting ring (small diameter) 5 as shown in FIG. 7 is secured around hole 7a of main gear 7. Mounting rings 4 and 5 are disposed in a coaxial relationship to each other, and main bearing 6 is mounted between those rings 4 and 5. Accordingly, main gear 7 is rotatable relative to first housing 1 by means of main bearing 6.

Figure 10:
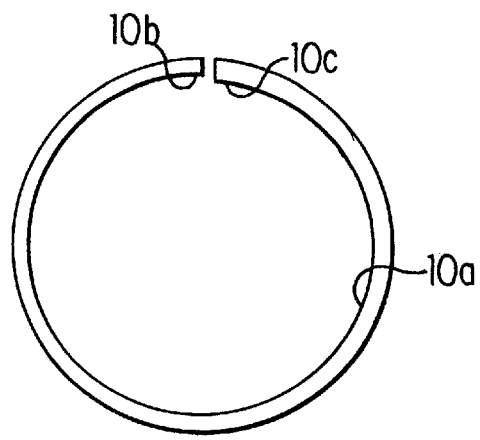
FIG. 10 is a front elevational view of a cam.
Figure 9:
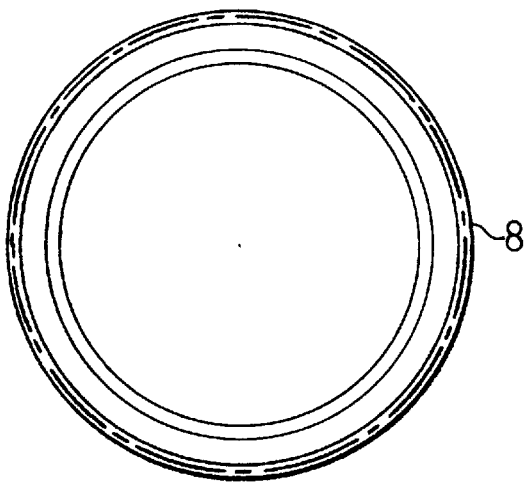
FIG. 9 is a front elevational view of a cam mounting gear.

Reference numeral 8 denotes such a cam mounting gear as shown in FIG. 9. Cam mounting gear 8 is supported for rotation independently of main gear 7 by a plurality of bearings 9 (only one is shown in FIG. 2) mounted in the proximity of the outer periphery of main gear 7. Cam mounting gear 8 has a number of teeth smaller by one than that of main gear 7. Cam 10 is disposed on the inner wall of cam mounting gear 8 with, for example, wedges (not shown) or like elements fitted in a gap therebetween. As shown in FIG. 10, tapered face 10*a* is formed over the inner periphery of cam 10 such that the thickness of cam 10 gradually increases from start point 10*b* toward end point 10*c*.

First pinion 11 is supported for rotation at one end of first housing 1 by means of two bearings 12 and collar 13. First pinion 11 has teeth held in meshing engagement with the teeth of main gear 7 so that main gear 7 is driven to rotate by a driving force applied to pulley 14 mounted on the pinion shaft.

Second pinion 15 is supported for rotation at the other ends of first housing 1 and third housing 3 by means of bearing 26. Second pinion 15 has teeth held in meshing engagement with the teeth of both of main gear 7 and cam mounting gear 8 and accordingly has a function of transmitting rotation of main gear 7 to cam mounting gear 8. Second pinion 15 has also another function of positioning cam mounting gear 8. This function can be realized by pressing a head portion of shaft 15*a* of second pinion 15 against coil spring 16 with a finger to bring the teeth of second pinion 15 out of engagement with the teeth of cam mounting gear 8. Details of the positioning function will be hereinafter described.

Figure 12:
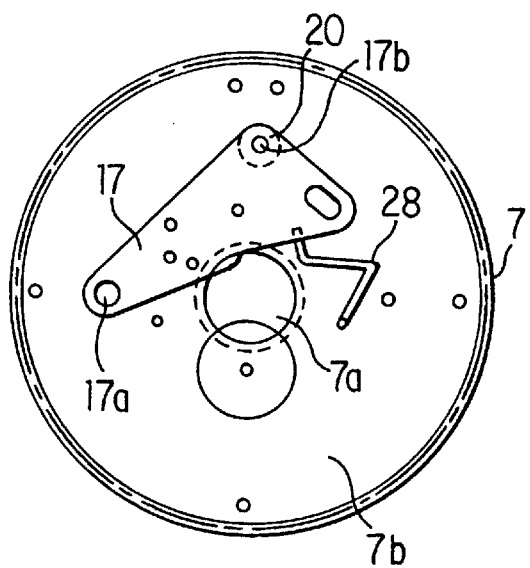
FIG. 12 is a schematic view showing the main holder mounted on the main gear.
Figure 11A:
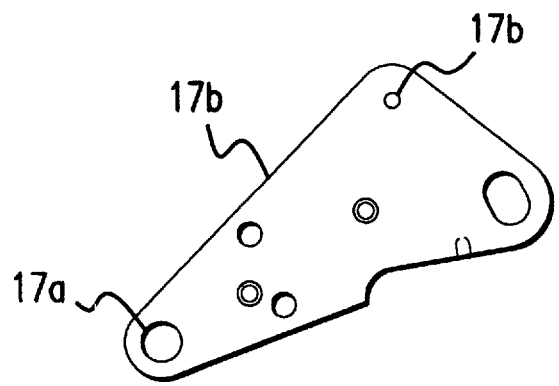
FIG. 11a is a front elevational view of a main holder.
Figure 11B:
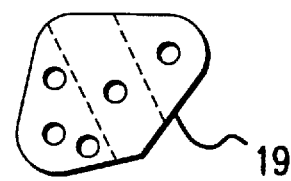
FIG. 11b is a front elevational view of a cutter blade mounting member.

Main holder 17 shown in FIG. 11*a* is supported for rotation at a predetermined position of flat face portion 7*b* of main gear 7 around a fulcrum provided by shaft 17*a* mounted at one end of main holder 17 as shown in FIG. 12, and is normally pressed by spring 28 provided at the other end thereof. Such cutter blade mounting member 19 as shown in FIG. 11*b* is secured at a substantially central portion of main holder 17 and has cutter blade 18 removably mounted thereon. Bearing 20 for contacting with a cam face (tapered face 10*a*) of cam 10 is supported for rotation on shaft 17*b* provided at the other end of main holder 17.

Figure 11C:
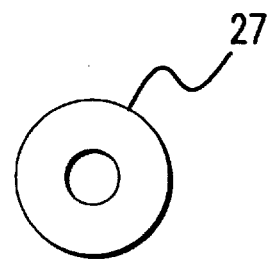
FIG. 11c is a front elevational view of an outer deburring roller.

Such outer deburring roller 27 as shown in FIG. 11*c* is mounted for rotation at flat face portion 7*b* of main gear 7 and normally contacts with a cut face of cutting object pipe 21 to prevent production of burrs on the cut face.

Chuck holding member 23 is secured to a portion of first housing 1 remote from second main bearing mounting ring 5 and holds pipe fixing chuck 22 for locating cutting object pipe 21 at a central location of the pipe cutting apparatus independently of the other components. Pipe fixing chuck 22 is fitted in hole 1*a* (refer to FIG. 4) of first housing 1 and chuck holding member 23 and secured by chuck fastening screw 24. Reference numeral 25 denotes a stop ring.

Operation of the present invention will be described below.

The rotating mechanism according to the present invention is characterized in that it makes use of the principle that, when the two gears (main gear 7 and cam mounting gear 8) having no center axes are rotated by the two pinions (first and second pinions 11 and 15) and main gear 7 is rotated by an amount of number equal to the number of teeth thereof, cam mounting gear 8 is rotated by a number of times equal to the (number of teeth of main gear 7 +1) and makes one relative rotation relative to main gear 7.

Figure 13A:
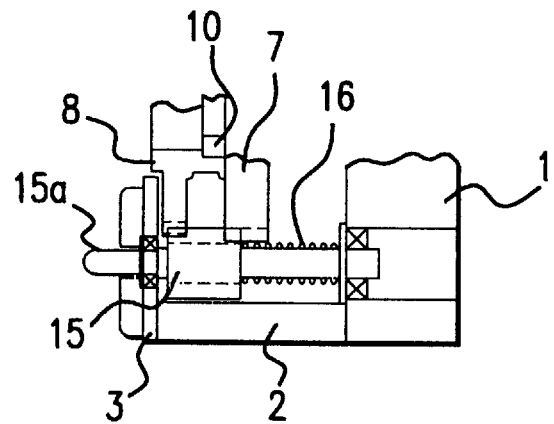
FIG. 13a is a schematic view showing a second pinion in an ordinary condition.
Figure 13B:
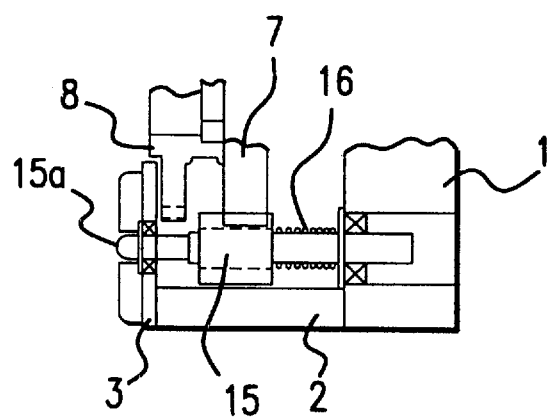
FIG. 13b is a similar view but showing the second pinion in a pressed condition.

First, as seen in FIG. 13*a*, shaft 15*a* of second pinion 15 is pressed, in an ordinary operating condition, with a finger or a like element to bring the teeth of second pinion 15 out of engagement with the teeth of cam mounting gear 8 (refer to FIG. 13*b*), and gear 8 is rotated to set bearing 20 of main holder 17 to start point 10*b* of cam 10 (refer to FIG. 10), that is, to position main holder 17 relative to cam 10. After completion of the positioning, second pinion 15 is returned to its condition of FIG. 13*a*. Then, cutting object pipe 21 is located onto and secured to pipe fixing chuck 22. Thereafter, first pinion 11 is rotationally driven to rotate main gear 7, second pinion 15 and cam mounting gear 8. Since the number of teeth of cam mounting gear 8 is smaller by one than that of main gear 7, each time main gear 7 makes one rotation, cam mounting gear 8 leads (is displaced forwardly) by one teeth distance with respect to main gear 7. This signifies that, each time main gear 7 makes one rotation, bearing 20 of main holder 17 mounted on flat face portion 7*b* of main gear 7 moves by a distance equal to 1/(the number of teeth of the main gear) the circumference of cam 10 on the cam face (tapered face 10*a*) of cam 10. Accordingly, if main gear 7 rotates by a number of times equal to the number of teeth thereof, then bearing 20 of main holder 17 travels over the full length on tapered face 10*a* of cam 10 and thus reaches end point 10*c* of cam 10. Since cutter blade mounting member 19 to which cutter blade 18 is secured is mounted on main holder 17, cutter blade 18 moves a distance equal to a difference of the thickness of cam 10 at start point 10*b* from the thickness of cam 10 at end point 10*c* in a direction toward the center of gears 7 and 8. Since the magnitude of the difference in thickness is set a little larger than the thickness of cutting object pipe 21, cutting object pipe 21 is cut after it is rotated by a number of times equal to the number of teeth of main gear 7.

Since outer deburring roller 27 remains, during the rotating operations of gears 7 and 8, in contact with a cut portion of the cutting object pipe 21 while being rotated, production of burrs on the cut face is eliminated completely.

Next cutting object pipe 21 is cut by repeating the operations described above.

In the embodiment of the present invention, the number of teeth formed on main gear 7 is 101 and the number of teeth formed on cam mounting gear 8 is 100, and accordingly, cutting object pipe 21 is cut as cam mounting gear 8 makes one rotation relative to main gear 7. The numbers of teeth of gears 7 and 8 may be arbitrary numbers only if the number of teeth of cam mounting gear 8 is smaller by one than that of main gear 7.

Further, since structures of various sizes can be constructed readily by varying the modules of the gears, small pipe cutting apparatus superior in durability can be constructed readily. Furthermore, since an engaging operation of gears is employed, the structure is simplified and much stabilized operation can be realized.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A pipe cutting apparatus, characterized in that it comprises a first pinion supported for rotation on a housing and driven to rotate by rotational driving means, a main gear supported for rotation on said housing and held in meshing engagement with said first pinion, a cam mounting gear mounted on said housing in parallel to said main gear for rotation independently of said main gear and having a number of teeth smaller by one than the number of teeth of said main gear, a cam secured along an inner wall of said cam mounting gear, a second pinion supported for rotation on said housing and held in meshing engagement with said main gear and said cam mounting gear, a pipe fixing chuck for removably holding a cutting object pipe such that the cutting object pipe extends through an opening provided at a central portion of said main gear, and a main holder supported for rotation on a flat face portion of said main gear and partially having a cutter blade mounting member and a bearing which engages and rotates with a cam face of said cam.

2. A pipe cutting apparatus as set forth in claim 1, characterized in that said cam mounting gear receives a rotational driving force from said first pinion via said second pinion to rotate together with said main gear.

3. A pipe cutting apparatus as set forth in claim 1, characterized in that said main gear is mounted for rotation on said housing by means of first and second main bearing mounting rings and a main bearing disposed between said first and second main bearing mounting rings.

4. A pipe cutting apparatus as set forth in claim 1, characterized in that the cutting object pipe is fixed independently of said main gear and said cam mounting gear at a central location of said main gear and said cam mounting gear by means of said pipe fixing chuck.

5. A pipe cutting apparatus as set forth in claim 1, characterized in that an outer deburring roller for normally contacting with a cut face of the cutting object pipe cut by a cutter blade to eliminate production of burrs on the cut face is supported for rotation on said flat face portion of said main gear.

6. A pipe cutting apparatus as set forth in claim 1, characterized in that said second pinion is movable in an axial direction to bring teeth of said second pinion out of engagement with teeth of said cam mounting gear.

7. A pipe cutting apparatus as set forth in claim 1, characterized in that said cam face is formed on an inner periphery of said cam such that said cam has a thickness which gradually increases from a start point toward an end point of said cam.

* * * * *